US012263565B2

(12) United States Patent
Reeder et al.

(10) Patent No.: US 12,263,565 B2
(45) Date of Patent: *Apr. 1, 2025

(54) TORQUE WRENCH

(71) Applicant: Milwaukee Electric Tool Corporation, Brookfield, WI (US)

(72) Inventors: Kyle Reeder, Waukesha, WI (US); Aaron M. Williams, Milwaukee, WI (US); Christopher S. Hoppe, Midvale, UT (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,537

(22) Filed: Nov. 10, 2023

(65) Prior Publication Data

US 2024/0075599 A1 Mar. 7, 2024

Related U.S. Application Data

(63) Continuation of application No. 18/147,544, filed on Dec. 28, 2022, now Pat. No. 11,850,711, which is a continuation of application No. 16/896,922, filed on Jun. 9, 2020, now Pat. No. 11,565,389, which is a continuation of application No. 15/725,399, filed on Oct. 5, 2017, now Pat. No. 10,688,635.

(60) Provisional application No. 62/405,444, filed on Oct. 7, 2016.

(51) Int. Cl.

| | |
|---|---|
| ***B25B 23/142*** | (2006.01) |
| ***B25B 13/46*** | (2006.01) |
| ***B25B 23/14*** | (2006.01) |

(52) U.S. Cl.
CPC ........ *B25B 23/1427* (2013.01); *B25B 13/465* (2013.01); *B25B 23/141* (2013.01)

(58) Field of Classification Search
CPC .............. B25B 23/0035; B25B 23/141; B25B 23/1427; B25B 23/142; B25B 13/463; B25B 13/465
USPC .................................................... 81/475, 477
See application file for complete search history.

(56) References Cited

U.S. PATENT DOCUMENTS

| | | | |
|---|---|---|---|
| 1,578,065 | A | 3/1926 | Bemus et al. |
| 1,628,467 | A | 5/1927 | Mandl |
| 1,807,134 | A | 5/1931 | Pfauser |
| 1,873,472 | A | 8/1932 | Pfauser |
| 2,290,197 | A | 7/1942 | Merriman et al. |
| 2,667,800 | A | 2/1954 | Garwood |

(Continued)

*Primary Examiner* — Eric J Rosen
*Assistant Examiner* — Aaron R McConnell
(74) *Attorney, Agent, or Firm* — Reinhart Boerner Van Deuren s.c.

(57) ABSTRACT

A torque wrench including a head, a handle, a primary beam, a secondary beam, and a torque adjustment mechanism. The primary beam couples the head and the handle for co-rotation about the rotational axis and the primary beam includes a first end adjacent the head and a second end adjacent the handle. The secondary beam is coupled to the head for rotation with the head about the rotational axis and the secondary beam is movable relative to the primary beam and the handle. The torque adjustment mechanism adjusts a torque setting of the primary beam relative to the secondary beam. The torque adjustment mechanism includes a thumb adjustment wheel that a user rotates about a first axis to adjust the torque setting by moving the second end of the primary beam relative to the handle along a second axis offset from the first axis.

20 Claims, 9 Drawing Sheets

(56) References Cited

U.S. PATENT DOCUMENTS

| | | | |
|---|---|---|---|
| 3,608,403 | A | 9/1971 | Green |
| 3,638,519 | A | 2/1972 | Rebold |
| 3,847,038 | A | 11/1974 | Green |
| 4,290,329 | A | 9/1981 | Green |
| 4,408,504 | A | 10/1983 | Dobosh |
| 4,603,606 | A | 8/1986 | Headen |
| 4,665,390 | A | 5/1987 | Kern et al. |
| 4,709,598 | A | 12/1987 | Headen |
| 4,709,602 | A | 12/1987 | Grabovac et al. |
| 4,939,961 | A | 7/1990 | Lee |
| 5,007,311 | A | 4/1991 | Lee |
| 5,199,329 | A | 4/1993 | Hsu |
| 5,619,890 | A | 4/1997 | Hattori et al. |
| 5,653,151 | A | 8/1997 | Blacklock |
| 5,709,137 | A | 1/1998 | Blacklock |
| 5,996,453 | A | 12/1999 | Blacklock |
| 7,267,033 | B1 | 9/2007 | Lai |
| 7,367,250 | B2 | 5/2008 | Rainone et al. |
| 9,457,457 | B2 | 10/2016 | Chiang |
| 9,597,782 | B2 | 3/2017 | Abel |
| 2004/0083858 | A1 | 5/2004 | Carnesi |
| 2006/0102442 | A1 | 5/2006 | Dein |
| 2007/0095155 | A1 | 5/2007 | Rainone et al. |
| 2007/0256525 | A1 | 11/2007 | Lee |
| 2008/0229888 | A1 | 9/2008 | Ishmael |
| 2008/0276762 | A1 | 11/2008 | Dein |
| 2009/0260491 | A1 | 10/2009 | Rainone et al. |
| 2015/0314426 | A1 | 11/2015 | Chiang |
| 2016/0271761 | A1 | 9/2016 | Chang |

TORQUE WRENCH

CROSS-REFERENCE TO RELATED PATENT APPLICATIONS

The present application is a continuation of U.S. application Ser. No. 18/147,544, filed on Dec. 28, 2022, which is a continuation of U.S. application Ser. No. 16/896,922, now U.S. Pat. No. 11,565,389, filed on Jun. 9, 2020, which is a continuation of U.S. application Ser. No. 15/725,399, now U.S. Pat. No. 10,688,635, filed Oct. 5, 2017, which claims priority to U.S. Provisional Patent Application No. 62/405,444, filed on Oct. 7, 2016, which are incorporated herein by reference in their entireties.

BACKGROUND OF THE INVENTION

The present invention relates to torque wrenches. Torque wrenches are used to tighten fasteners and the like to a predetermined amount of torque. Torque wrenches can include an adjustment mechanism that sets a torque value. The wrench is then used to tighten the fastener and when the set torque value is reached the wrench indicates to the user that the set torque has been reach so that the user can stop torqueing or tightening the fastener. The indication can be a visual or audible indication. In other embodiments, torque wrenches include a gauge that indicates to the user the amount of torque currently being applied by the user and the user then stops torqueing the fastener when they reach the desired torque setting displayed on the gauge.

SUMMARY OF THE INVENTION

In one embodiment, the invention provides a torque wrench including a head, a handle, a primary beam, a secondary beam, and a torque adjustment mechanism. The head is configured to rotate a fastener about a rotational axis. The handle is operable to rotate the head about the rotational axis. The primary beam couples the head and the handle for co-rotation about the rotational axis and the primary beam includes a first end adjacent the head and a second end adjacent the handle. The secondary beam is coupled to the head for rotation with the head about the rotational axis and the secondary beam is movable relative to the primary beam and the handle. The torque adjustment mechanism is operable to move the primary beam relative to the secondary beam to adjust a torque setting. The torque adjustment mechanism includes a thumb adjustment wheel that a user rotates about a first axis to adjust the torque setting by moving the second end of the primary beam relative to the handle along a second axis that is offset from the first axis.

In another embodiment, the invention provides a torque wrench including a head configured to rotate a fastener about a rotational axis, the head including a first side and a second side opposite the first side. A handle is operable to rotate the head about the rotational axis. The wrench further includes a ratchet mechanism including a through bore, the rotational axis extends through the through bore. The wrench further includes a drive arbor that extends through the through bore, the drive arbor movable relative to the head within the through bore and along the rotational axis between a first position and a second position. In the first position the drive arbor extends out from the first side of the head and the ratchet mechanism couples the drive arbor and the handle for rotation about the rotational axis in a first direction and the handle is able to rotate relative to the drive arbor about the rotational axis is a second direction opposite the first direction, in the second position the drive arbor extends out from the second side of the head and the ratchet mechanism couples the drive arbor and the handle for rotation about the rotational axis in the second direction and the handle is able to rotate relative to the drive arbor about the rotational axis in the first direction. The wrench further includes a primary beam, a secondary beam, and a torque adjustment mechanism. The primary beam couples the head and the handle for rotation about the rotational axis and the primary beam includes a first end adjacent the head and a second end adjacent the handle. The secondary beam is coupled to the head for rotation with the head about the rotational axis and the secondary beam is movable relative to the primary beam and the handle. The torque adjustment mechanism is operable to move the primary beam relative to the secondary beam to adjust a torque setting.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
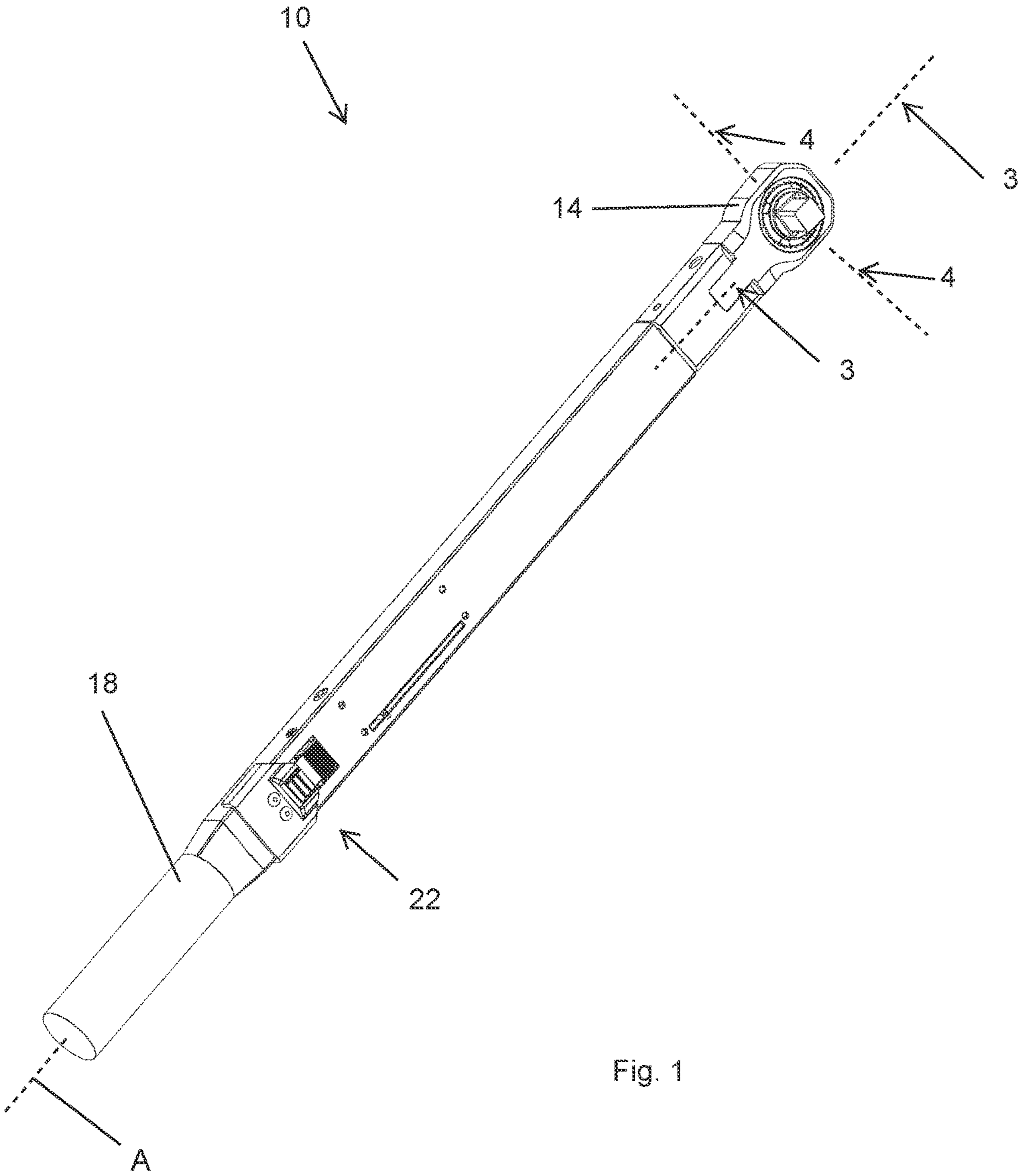
FIG. 1 is a perspective view of a torque wrench according to one embodiment.
Figure 2:
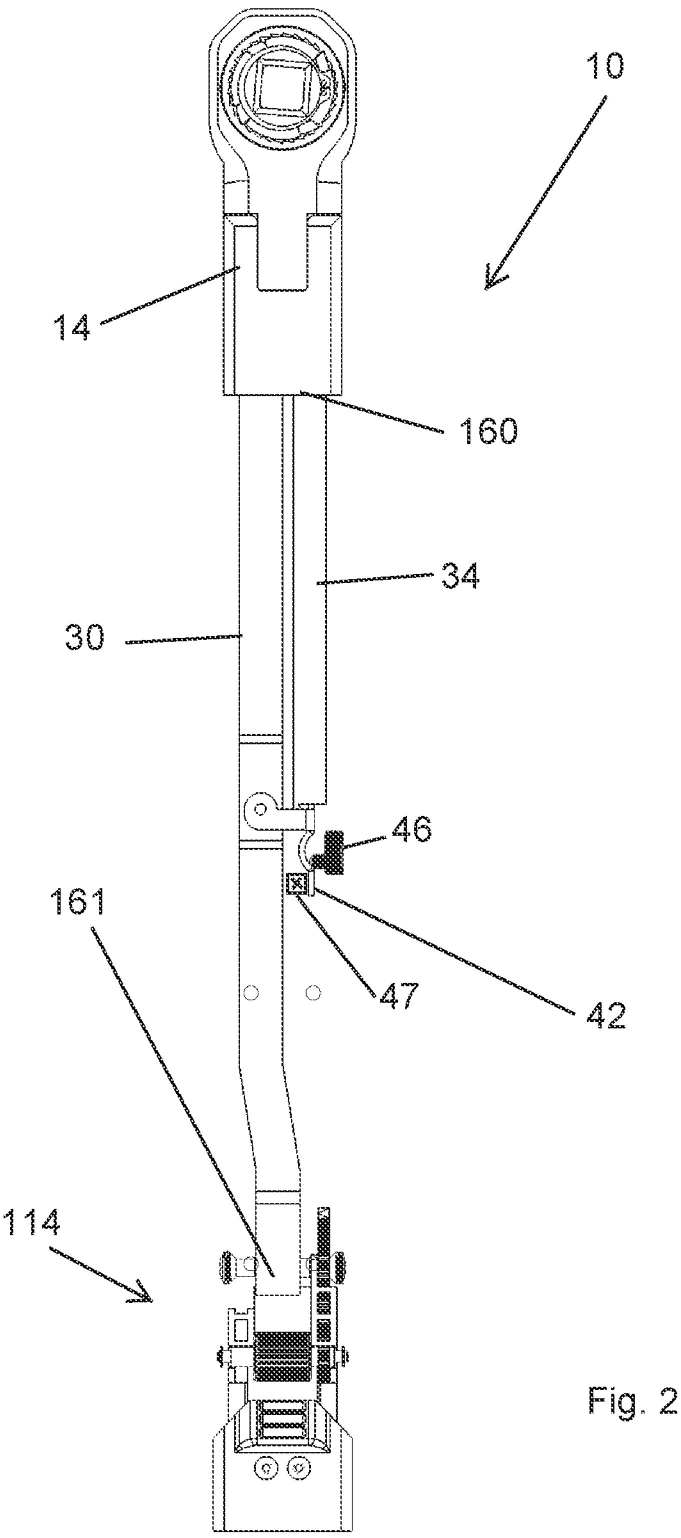
FIG. 2 is a side view of the torque wrench of FIG. 1 with a handle removed.

FIG. 1 illustrates a torque wrench 10 for applying a predetermined amount of torque to a fastener or the like. The torque wrench 10 includes a head 14, a handle 18 defining a longitudinal axis A, and a torque adjustment assembly 22. Referring to FIG. 2, the torque wrench 10 further includes a primary beam 30 and a secondary beam 34, both located within the handle 18 and fixed to the head 14 for rotation with the head 14. As will be discussed in more detail below, the primary and secondary beams 30, 34 are releasably connected by a trigger 42 that is biased by a spring 47. A trigger actuator 46 is coupled to the handle 18 adjacent the trigger 42.

Figure 3:
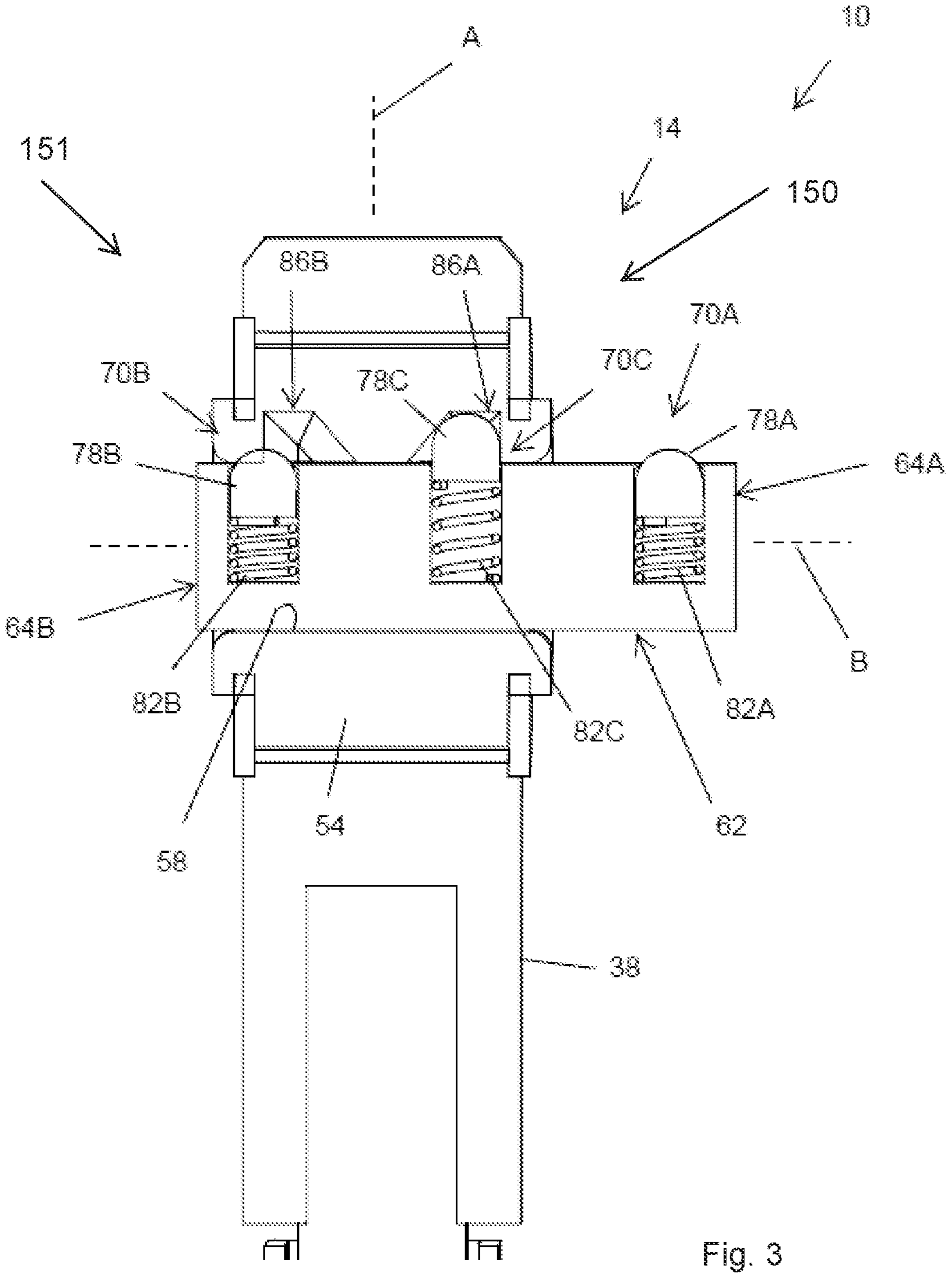
FIG. 3 is a cross-sectional view of a head of the torque wrench of FIG. 1 through line 3-3 in FIG. 1.
Figure 4:
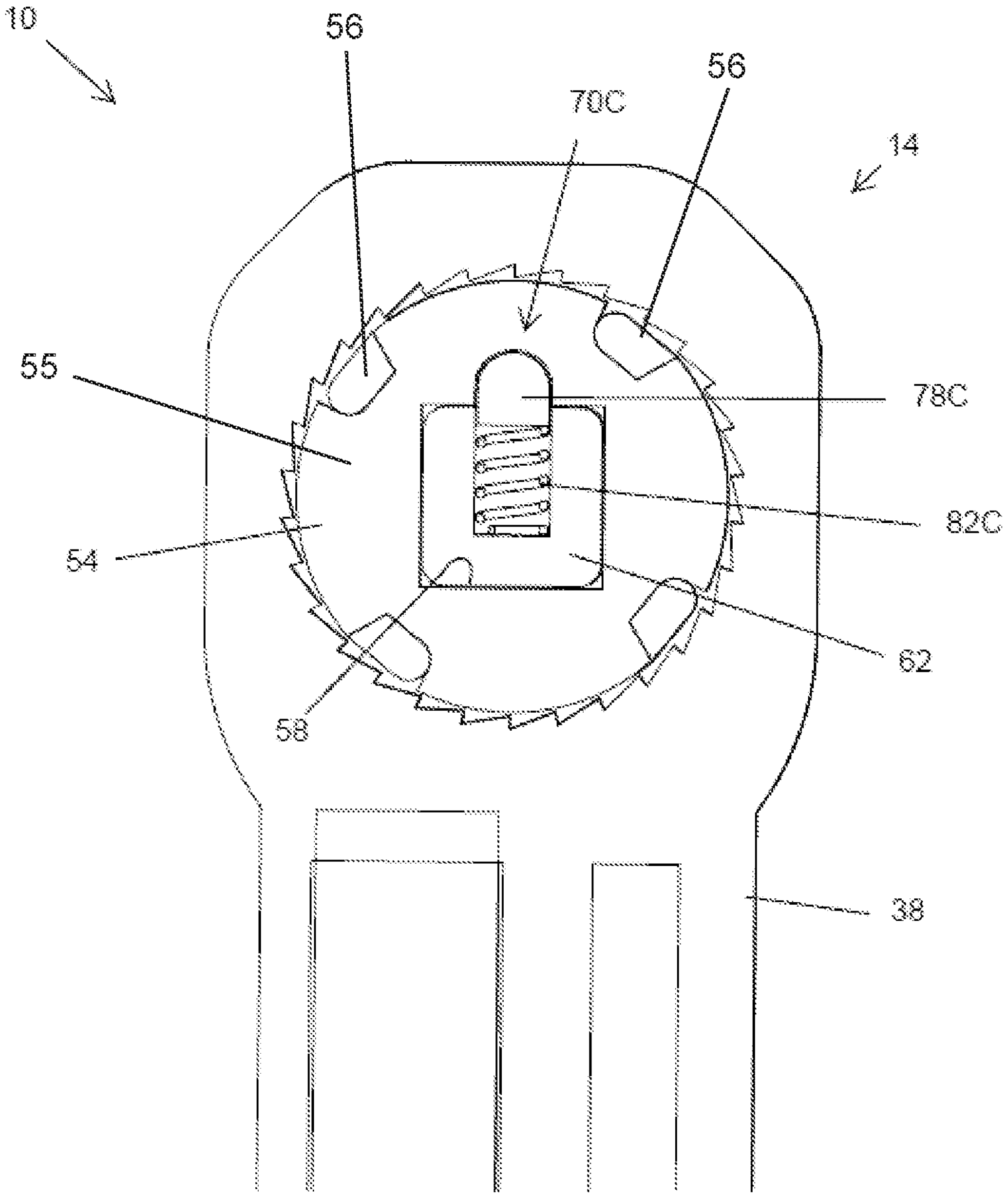
FIG. 4 is a cross-sectional view of the head assembly of the torque wrench of FIG. 1 through line 4-4 in FIG. 1.

Referring to FIG. 4, the head 14 supports a ratchet mechanism 54. The ratchet mechanism includes a ratchet wheel 55 and pawls 56 that engage the ratchet wheel 55. The ratchet wheel 55 defines a through bore 58 that receives a drive arbor 62. Referring to FIG. 3, the bore 58 defines a rotation or drive axis B extending perpendicular to the longitudinal axis A of the handle 18. The head 14 and drive arbor 62 can rotate about the axis B via the handle 18 to torque or tighten a fastener. Note, a socket or the like can be attached to the drive arbor to facilitate rotation of the fastener (e.g., nut, bolt, screw, etc.).

The drive arbor 62 has opposing first and second ends 64A, 64B. The drive arbor 62 may be pushed along the axis B through the bore 58 so that the first and second ends 64A, 64B selectively extend from either a first side 150 or a second side 151 of the head 14 (i.e., first and second positions of the drive arbor 62). In the first position, the drive arbor 62 extends out from the first side 150 of the head 14 and the ratchet mechanism 54 couples the drive arbor 62 and the handle 18 for rotation about the rotational axis B in a first direction and the handle 18 is able to rotate relative to the drive arbor B about the rotational axis B is a second direction opposite the first direction. In the second position, the drive arbor 62 extends out from the second side 151 of the head 14 and the ratchet mechanism 54 couples the drive arbor 62 and the handle 18 for rotation about the rotational axis B in the second direction and the handle 18 is able to rotate relative to the drive arbor 62 about the rotational axis B in the first direction. This allows a user to switch the direction that torque is applied. The drive arbor 62 has two end detent mechanisms 70A, 70B, one at each end 64A, 64B of the drive arbor 62, and a central detent mechanism 70C centrally located on the drive arbor 62. Each of the illustrated detents 70 includes a ball detent 78 outwardly biased by a spring 82. The detent 78C of the central detent mechanism 70C is selectively received in one of two recesses 86A, 86B defined in the ratchet wheel 54 to secure the drive arbor 62 depending on which side of the head assembly 14 that the drive arbor 62 is extending from (i.e., the first and second drive positions). Various drive sockets (not shown) or other tool attachments may be coupled to the end 64A, 64B of the drive arbor 62 that extends from the head assembly 14 via the corresponding end detent mechanism 70A, 70B.

Figure 5:
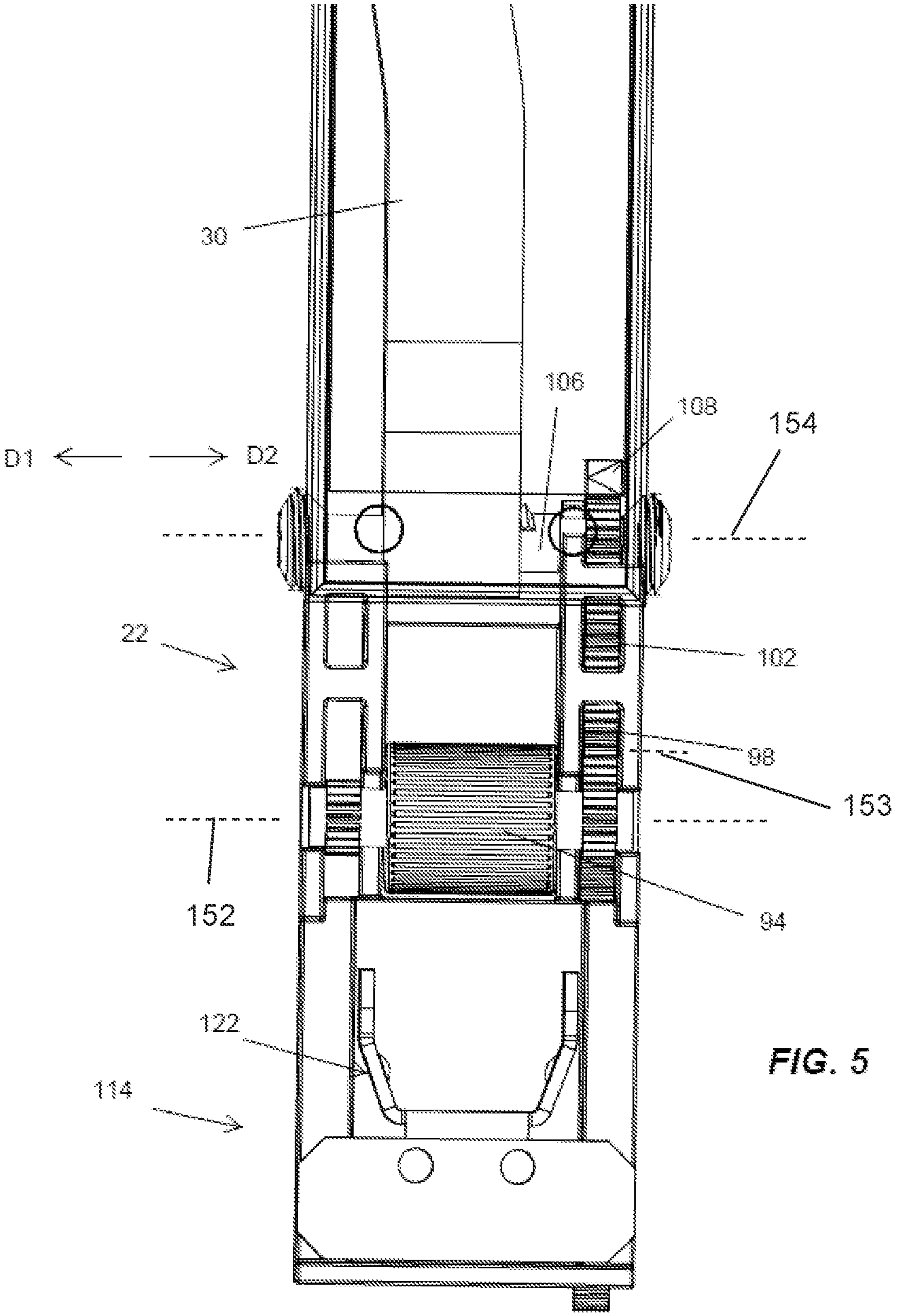
FIG. 5 is a side view of a torque adjustment assembly of the torque wrench of FIG. 1.
Figure 6:
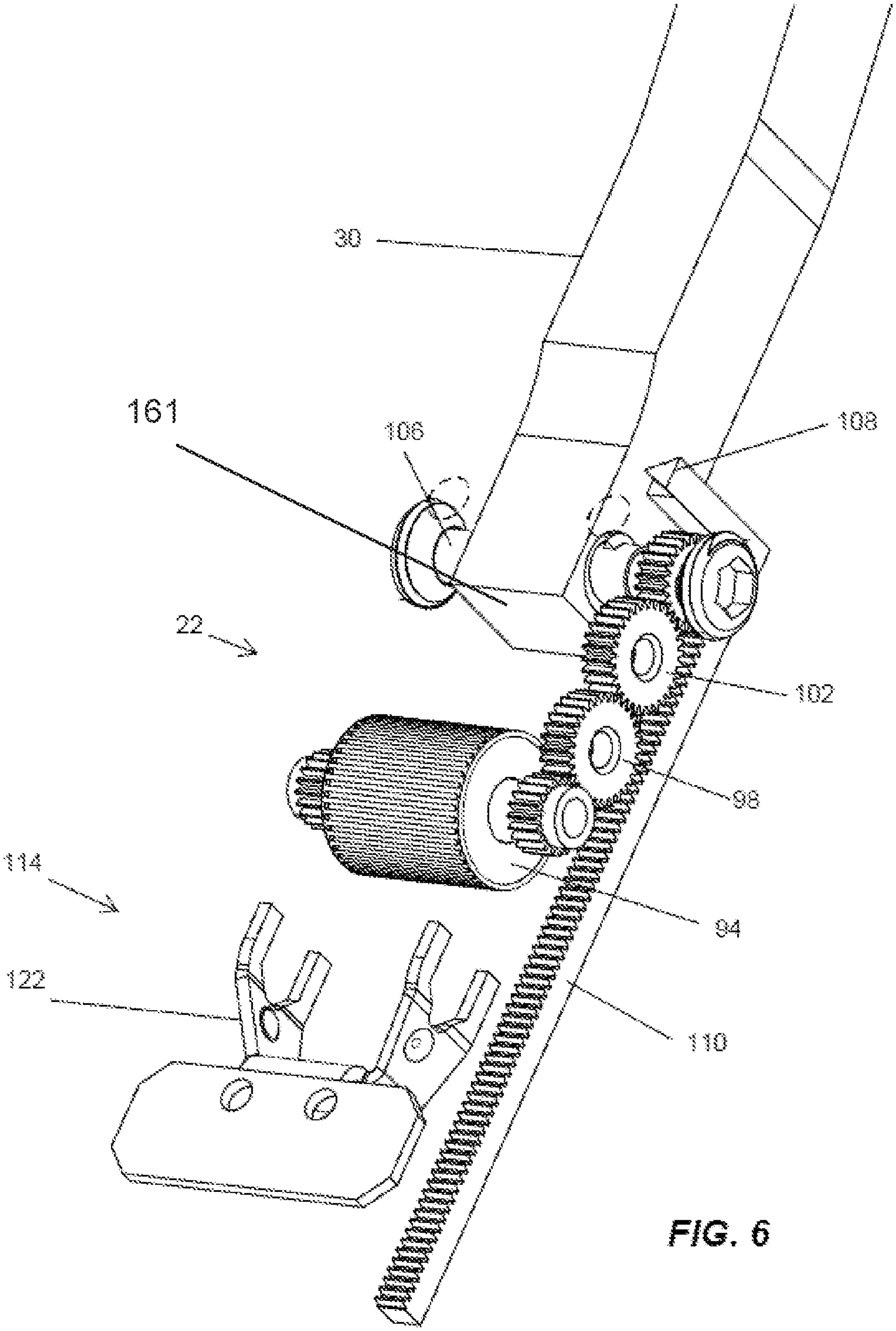
FIG. 6 is a perspective view of the torque adjustment assembly of FIG. 5.
Figure 8:
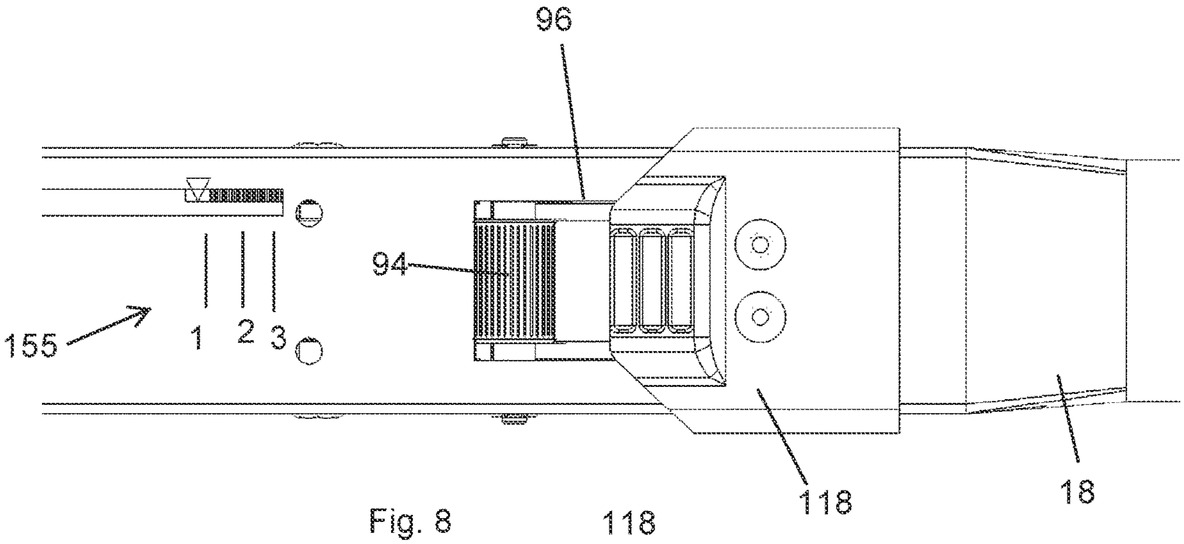
FIG. 8 is a side view of the torque wrench of FIG. 1 illustrating an adjustment locking member in an unlocked position.

With reference to FIGS. 5-6, the torque adjustment assembly 22 includes a thumb adjustment wheel 94 that is accessible through an opening 96 defined in a face of the handle 18 (see FIG. 8). The face defining the opening 96 is in a plane orthogonal to the drive axis B. The torque adjustment assembly 22 further includes a first gear 98, a second gear 102, and a worm gear 106 threaded to an end of the primary beam 30. The thumb adjustment wheel 94 is rotatable about axis 152 to rotate the first gear 98 about axis 153 to drive the second gear 102. The second gear 102 rotates drives the worm gear 106 about axis 154 to laterally move the end of the primary beam 30 along the axis 154 of the worm gear 106 to bend the primary beam 30 more or less.

The torque wrench 10 includes a display 155 (FIGS. 8 and 9) on the side of the handle 18 to indicate the torque setting of the torque wrench 10 based on a location of the worm gear 106. An indicator arrow 108 is connected to a gear rack 110 that moves laterally and parallel to the longitudinal axis A of the handle driven by the worm gear 106 as the thumb adjustment wheel 94 is rotated. In the illustrated embodiment, the indicator arrow 108 points at markings corresponding to various torque values within a range of torque values that may be applied to the fastener by the torque wrench 10. In some embodiments, the markings may be one or more stickers, pad printed, laser engraved, etc.

Figure 9:
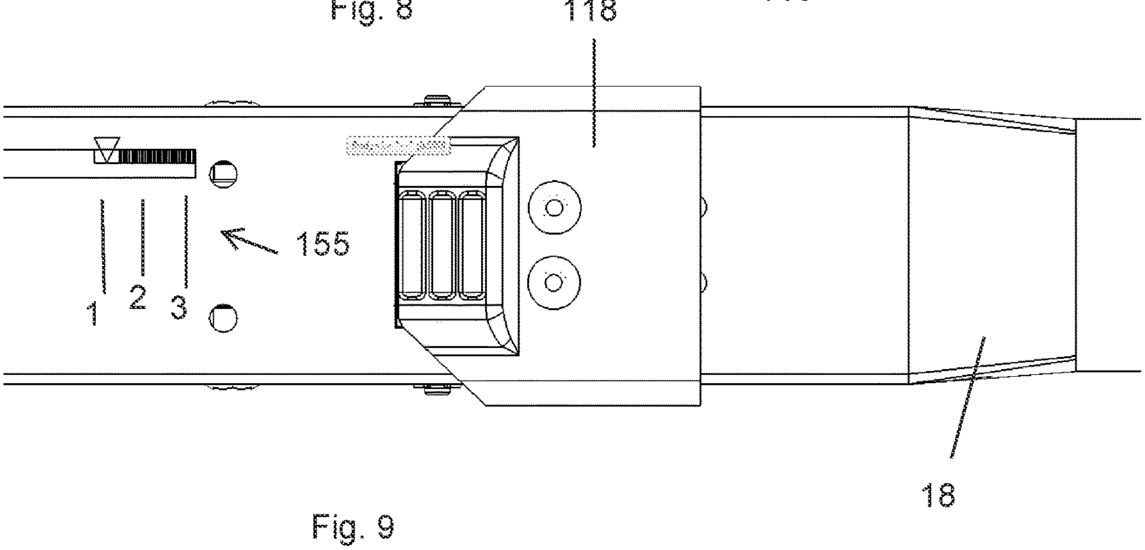
FIG. 9 is a side view of the torque wrench of FIG. 1 illustrating the adjustment locking member in the locked position.
Figure 10:
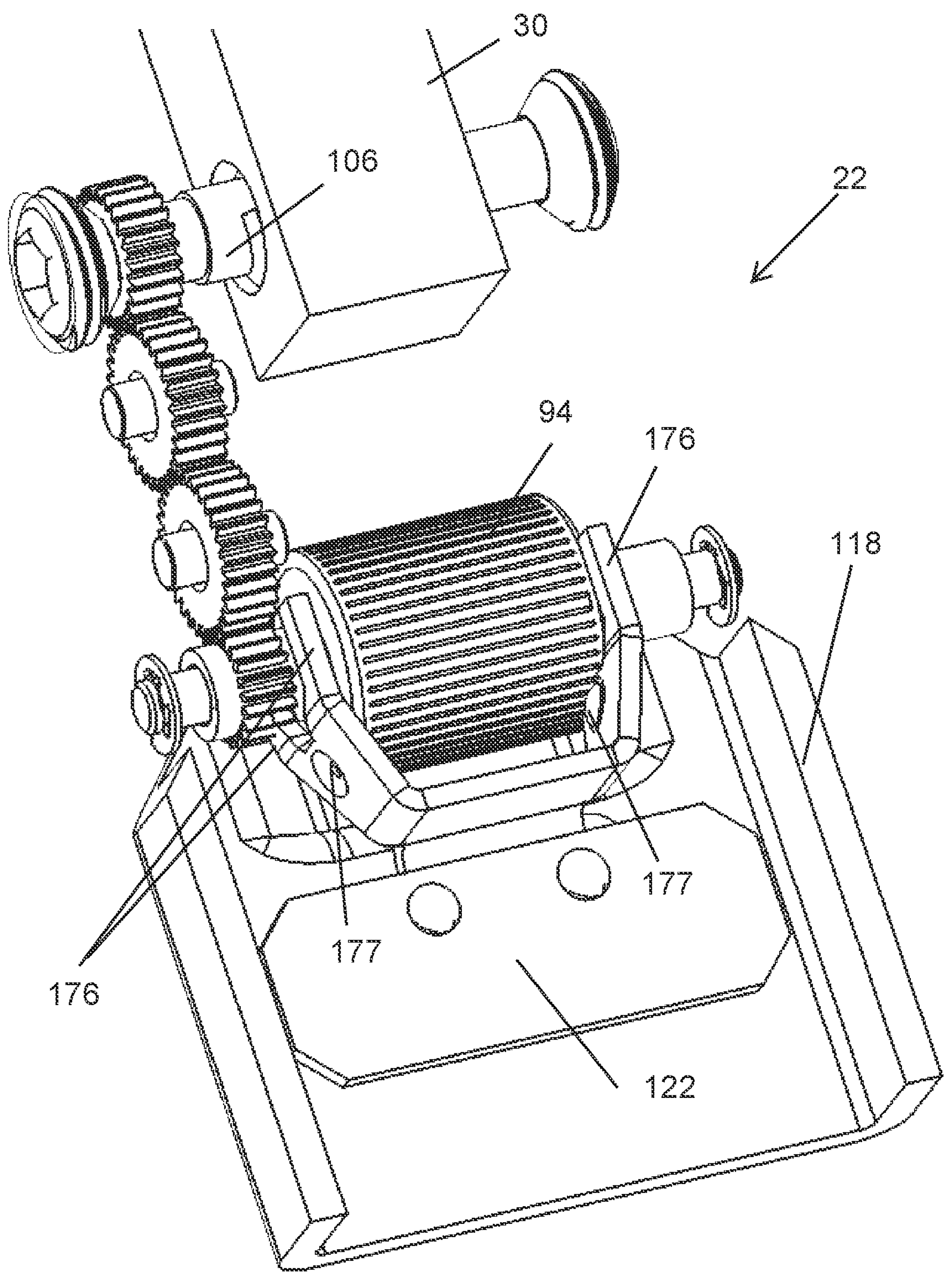
FIG. 10 is a perspective view of a portion of the torque wrench of FIG. 1 illustrating the adjustment locking member in the locked position.

With reference to FIGS. 6 and 10-9, the torque adjustment assembly 22 further includes an adjustment locking mechanism 114 including a cover 118 (FIG. 1) and a locking member 122. The cover 118 and the locking member 122 are coupled together so as to move parallel to the axis A between a locked position (FIG. 9) and an unlocked position (FIG. 8). In the locked position, the locking member 122 engages the thumb adjustment wheel 94 to prevent further torque adjustment and the cover 118 covers the adjustment wheel 94. In the unlocked position, the locking member 122 is disengaged from the thumb adjustment wheel 94 and the thumb adjustment wheel 94 is uncovered and accessible. A user may move the adjustment locking mechanism into the locked position, once the predetermined torque has been set by the user via the thumb adjustment wheel 94.

In operation of the torque wrench 10, when the adjustment locking mechanism 114 is in the unlocked position, a user first sets a predetermined torque via the adjustment wheel 94 of the torque adjustment assembly 22. The predetermined torque may be adjusted by the user by rotating the adjustment wheel 94 about the axis 153.

Figure 7:
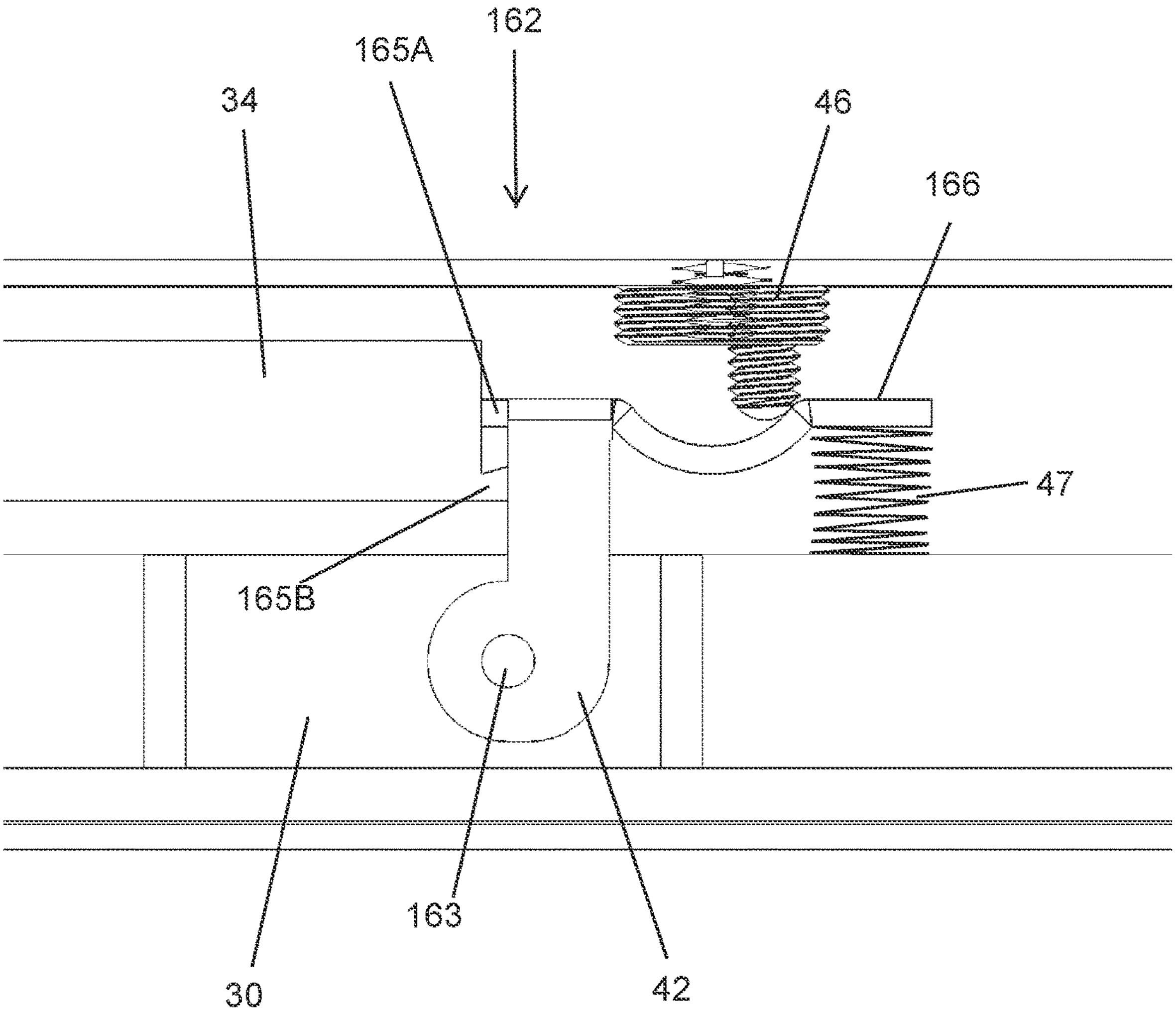
FIG. 7 is a side view of a portion of the torque wrench of FIG. 1 with a portion of the handle remove.

As shown in FIG. 2, both the primary and secondary beams 30, 34 are anchored at first end 160 to the head 14 of the torque wrench 10. At a second end 161 of the primary beam 30, the primary beam 30 is fixed to the handle 18 via the adjustment 22. Referring to FIG. 7, when a torqueing force is applied to the handle 18 (e.g., in direction of arrow 162 in FIG. 7), the primary beam 30 moves away from the secondary beam 34. Because the primary beam 30 and the handle 18 are connected/fixed at the end 161 of the primary beam 30, the actuator screw 46 is mostly fixed in position relative to the primary beam 30. Thus, when the torqueing force is applied in the in the direction of arrow 162 in FIG. 7, the primary beam 30, the trigger 42 (which is attached to the primary beam 30 via a pin 163), and the actuator 46 moves in the direction of arrow 162 while the secondary beam 34 remains stationary (e.g., stationary respect to the head 14 of the torque wrench 10). Overlapping tongues 165A, 165B (FIG. 7) eventually engage and, when a set amount of torque is applied, the actuator 46 presses against a tang 166 on the trigger 42 which disengages the overlapping tongues 165A, 165B, thereby creating an audible clicking noise and indicating that the set torque has been applied to the workpiece.

To increase the torque setting, the thumb adjustment wheel 94 is rotated in a first direction, thereby moving the primary beam 30 and the trigger 42 in a first direction D1 (FIG. 5) away from the trigger actuator 46. The predetermined torque may be decreased by rotating the adjustment wheel 94 in a second direction opposite the first direction, thereby moving the primary beam 30 and the trigger 42 in a second direction D2 (FIG. 5) toward the trigger actuator 46. Once the desired predetermined torque is set, the user may move the adjustment locking mechanism 114 to the locked position to prevent accidentally adjusting the predetermined torque setting during operation.

Referring to FIGS. 8-10, to move the locking mechanism from the unlocked position (FIG. 8) to the locked position (FIGS. 9 and 10), the user slide the cover 118 relative to the handle 18 to cover the thumb adjustment wheel 94. Meanwhile, the locking member 122, connected to the cover 118 to slide with the cover 118, engages the thumb adjustment wheel 94 to inhibit rotation of the wheel 94. The locking member 122 includes fingers 176 and detents 177. The fingers 176 keep the locking member 122 in alignment and prevent the detents 177 from moving (e.g., from riding an outer surface of the thumb wheel rather than over the ridge of the thumb wheel). When the locking member 122 is moved toward the thumb wheel, the detents 177 are moved over the ridge on the side of the thumb wheel 94, and a compressive force between the two detents 177 prevents the thumb wheel 94 from rotating.

In order to switch the torqueing direction of the torque wrench 10, when the drive arbor 62 is in the first drive position (FIG. 4), one simply pushes the exposed, first end 64A of the drive arbor 62 axially along the drive axis B into the bore 58 causing the other, second end 64B of the drive arbor 62 to extend from the opposite side of the head assembly 14. In particular, pushing the exposed, first end 64A of the drive arbor 62 causes the first recess 86A nearest the exposed, first end 64A of the drive arbor 62 receiving the detent 78C of the central detent mechanism 70C to urge the detent 78C against the biasing force of the spring 82C and out of the first recess 86A. Further pushing the drive arbor 62 causes the opposite, second end 64B of the drive arbor 62 to extend from the bore 58 and the central detent mechanism 70C to align with the other, second recess 86B such that the detent 78C is biased into the second recess 86B to secure the drive arbor 62 in the second drive position. The same process is repeated in reverse to switch the torqueing direction back.

Although the invention has been described in detail with reference to certain preferred embodiments, variations and modifications exist within the scope and spirit of one or more independent aspects of the invention as described.

What is claimed is:

1. A torque wrench, comprising:

a handle extending along a longitudinal axis and configured to be grasped by a user;

a head configured to rotate a fastener about a rotational axis, the head comprising:

a first side;

a second side opposite the first side;

a ratchet mechanism including a through bore, the rotational axis extending through the through bore; and a drive arbor that extends through the through bore, the drive arbor comprising a first end and a second end opposite the first end along the rotational axis;

a primary beam coupled to the handle and the head;

a secondary beam coupled to the head and selectively coupled to the primary beam;

a torque adjustment mechanism that moves the primary beam relative to the secondary beam, the torque adjustment mechanism comprising:

a rack gear; and a gear coupled to the rack gear;

wherein the ratchet mechanism couples the drive arbor to the handle for rotation about the rotational axis in a first direction and allows the handle to rotate relative to the drive arbor in a second direction opposite the first direction; and wherein both the first end and the second end of the drive arbor are configured to engage the fastener.

2. The torque wrench of claim 1, wherein the first end of the drive arbor extends out from the first side of the head when the drive arbor is in a first position and the second end of the drive arbor extends out from the second side of the head when the drive arbor is in a second position.

3. The torque wrench of claim 1, further comprising a display, the display comprising:

an indicator arrow; and markings on a side of the handle; and wherein the markings are engraved on the side of the handle.

4. The torque wrench of claim 1, further comprising a worm gear coupled to the gear;

wherein the worm gear engages the primary beam and rotates to move the primary beam and adjust a torque setting; and wherein rotation of the gear moves the worm gear and the primary beam.

5. The torque wrench of claim 1, further comprising an actuator with overlapping tongues, the overlapping tongues being positioned between the primary beam and the secondary beam, wherein, when a set amount of torque is applied to the handle, the overlapping tongues disengage from each other to create an audible clicking noise that indicates that a set torque has been applied to a workpiece.

6. The torque wrench of claim 1, further comprising a worm gear coupled to a thumb adjustment wheel, wherein, when the thumb adjustment wheel is rotated, the worm gear and the gear both rotate and move the rack gear.

7. The torque wrench of claim 1, wherein the torque adjustment mechanism further comprises a thumb adjustment wheel coupled to the gear, wherein, when actuated, the thumb adjustment wheel moves the primary beam relative to the handle to adjust a torque setting.

8. The torque wrench of claim 7, wherein the thumb adjustment wheel is located on a face of the handle, wherein the face is defined between a first side and a second side of the handle.

9. A torque wrench, comprising:

a head configured to engage a fastener;

a handle extending along a longitudinal axis and configured to be grasped by a user;

a primary beam coupled to the handle and the head;

a secondary beam coupled to the head and selectively coupled to the primary beam; and a torque adjustment mechanism that moves the primary beam relative to the secondary beam, the torque adjustment mechanism comprising:

a rack gear; and an indicator arrow;

wherein the indicator arrow moves in response to movement of primary beam relative to the secondary beam.

10. The torque wrench of claim 9, further comprising a marking on a side of the handle, wherein the indicator arrow is coupled to the rack gear.

11. The torque wrench of claim 9, the torque adjustment mechanism further comprising an adjustment wheel and a gear coupled to the rack gear;

wherein the adjustment wheel rotates about a first axis and the gear rotates about a second axis, and wherein the first axis and the second axis are parallel and offset from each other along the longitudinal axis.

12. The torque wrench of claim 11, further comprising an adjustment locking mechanism selectively coupled to the adjustment wheel, wherein the adjustment locking mechanism couples to the adjustment wheel to lock further adjustment of the primary beam relative to the secondary beam.

13. The torque wrench of claim 12, further comprising a cover coupled to the adjustment locking mechanism, wherein, when the user slides the cover along the handle to cover the adjustment wheel, the adjustment locking mechanism engages the adjustment wheel to lock the torque adjustment mechanism.

14. The torque wrench of claim 12, further comprising fingers and detents on opposite sides of the adjustment locking mechanism, wherein the fingers align the adjustment locking mechanism relative to the adjustment wheel and a compressive force applied by the detents on the adjustment wheel locks the torque adjustment mechanism.

15. The torque wrench of claim 9, further comprising a drive arbor that extends along a drive axis of a bore defined in the head, wherein the drive arbor has a first end and a second end, and wherein, when the first end is exposed, the user pushes the first end of the drive arbor along the drive axis to expose the second end.

16. The torque wrench of claim 15, wherein, when the first end is exposed, the drive arbor rotates in a first direction about a rotational axis relative to the handle, and wherein, when the second end is exposed, the drive arbor rotates in a second direction, opposite the first direction, about the rotational axis.

17. A torque wrench, comprising:

a head configured to engage a fastener;

a handle configured to be grasped by a user;

a primary beam coupled to the handle and to the head;

a secondary beam coupled to the head and selectively coupled to the primary beam;

a torque adjustment assembly that moves the primary beam relative to the secondary beam, the torque adjustment assembly, comprising:

a rack gear coupled to an indicator arrow; wherein, when the torque adjustment assembly moves the primary beam relative to the secondary beam, the rack gear and the indicator arrow move relative to the primary beam; and an adjustment locking mechanism adjustable between a locked position and an unlocked position, wherein, when the adjustment locking mechanism is in the locked position, the adjustment locking mechanism locks the torque adjustment assembly and prevents the rack gear from moving relative to the primary beam.

18. The torque wrench of claim 17, the torque adjustment assembly further comprising an adjustment wheel at least partially accessible through an opening in the handle; and wherein the adjustment locking mechanism covers the opening in the handle when the adjustment locking mechanism is in the locked position.

19. The torque wrench of claim 17, the torque adjustment assembly further comprising an adjustment wheel; and wherein, when the adjustment locking mechanism is in the locked position, the adjustment locking mechanism engages the adjustment wheel and prevents the adjustment wheel from rotating.

20. The torque wrench of claim 19, the adjustment locking mechanism further comprising fingers and detents between the fingers, wherein the fingers align the adjustment locking mechanism relative to the adjustment wheel and the detents move over a ridge on a side of the adjustment wheel to lock the adjustment wheel.

* * * * *